US007133906B2

(12) United States Patent
Price et al.

(10) Patent No.: US 7,133,906 B2
(45) Date of Patent: Nov. 7, 2006

(54) SYSTEM AND METHOD FOR REMOTELY CONFIGURING TESTING LABORATORIES

(75) Inventors: Chuck Price, Los Altos, CA (US);
Kelley Stover, Morgan Hill, CA (US);
Thomas Suplica, Palo Alto, CA (US);
Curtis Bray, Morgan Hill, CA (US);
Mary Rygaard, Sunnyvale, CA (US);
Ben Tsao, Palo Alto, CA (US)

(73) Assignee: Lumenare Networks, Santa Clara, CA (US)

( * ) Notice: Subject to any disclaimer, the term of this patent is extended or adjusted under 35 U.S.C. 154(b) by 826 days.

(21) Appl. No.: 09/785,008

(22) Filed: Feb. 16, 2001

(65) Prior Publication Data

US 2002/0032762 A1   Mar. 14, 2002

(51) Int. Cl.
*G06F 15/177* (2006.01)

(52) U.S. Cl. .................. 709/220; 709/221; 709/222; 709/223; 715/734; 715/735; 715/736; 370/241; 370/241.1; 370/292

(58) Field of Classification Search ................ 709/220, 709/224; 714/27, 43, 25, 738–742; 370/241
See application file for complete search history.

(56) References Cited

U.S. PATENT DOCUMENTS

| | | | |
|---|---|---|---|
| 5,577,198 A | 11/1996 | Willrett et al. | |
| 5,671,414 A | 9/1997 | Nicolet | |
| 5,796,953 A | 8/1998 | Zey | |
| 5,933,816 A | 8/1999 | Zeanah et al. | |
| 5,969,835 A | 10/1999 | Kamieniecki et al. | |
| 6,108,309 A * | 8/2000 | Cohoe et al. ................ | 370/241 |
| 6,269,330 B1 * | 7/2001 | Cidon et al. ................... | 714/43 |
| 6,397,359 B1 * | 5/2002 | Chandra et al. ............. | 714/712 |
| 6,425,096 B1 * | 7/2002 | Liese et al. ..................... | 714/43 |
| 6,466,971 B1 * | 10/2002 | Humpleman et al. ....... | 709/220 |
| 6,532,237 B1 * | 3/2003 | Or et al. ...................... | 370/396 |
| 6,674,724 B1 * | 1/2004 | Main et al. .................. | 370/241 |

FOREIGN PATENT DOCUMENTS

EP           0910194 A2     4/1999

* cited by examiner

*Primary Examiner*—Fritz Fleming
*Assistant Examiner*—Niketa Patel
(74) *Attorney, Agent, or Firm*—Carr & Ferrell LLP

(57) ABSTRACT

The invention provides a system for remotely configuring a plurality of devices to customize a lab network system for testing components and for training operators to use and maintain such systems. The system is configured to remotely access and control such a system via a computer network such as the Internet. Once connected, a user can run testing scenarios on the configured devices remotely from any location that has access to the Internet. In accordance with the invention, an organization's network equipment is integrated with specialized physical switching technologies, and controlled by unique management software. Access to the network equipment may be provided remotely, and granted via a scheduling service. Thus, multiple physical equipment labs can be integrated into one globally visible resource, enabling one-stop scheduling of lab time without knowing the detailed inventory of a particular network equipment facility. Storage capability is provided for network topologies described using a standards-based topology description language. This topology archive is integrated with the equipment lab management software allowing lab efforts to be saved for later reuse. In addition to topology and configuration information, complete session logs can also be saved, allowing "offline" analysis of lab activities. Network topologies and device configurations may be uniquely specified using a provided authoring environment to facilitate customized lab configurations.

36 Claims, 6 Drawing Sheets

SYSTEM AND METHOD FOR REMOTELY CONFIGURING TESTING LABORATORIES

The invention generally relates to systems for testing equipment and, more particularly, to a system and method for remotely configuring and running lab network topologies and scenarios.

BACKGROUND OF THE INVENTION

Service providers and corporations build engineering and support labs to validate new services, support customers, and extend their customer reach. To maintain and run these labs, institutions are investing heavily in network engineering professionals, buildings, and equipment. However, most current manual and device based lab methodologies are time consuming to construct and scale poorly for large projects. This, in turn, prevents reusability of lab test scenarios and severely reduces the ability to preserve "best practice" qualities.

Moreover, components for use in computer networks are generally complicated to use and expensive to manufacture. Often, their production runs are small and require a large amount of development resources to produce. For at least these reasons it can be expensive to build additional components for testing purposes and for training people on operating the components. However, for companies and institutions that produce components for computer networks, there is a business need to verify the operability of these components for potential customers.

One solution that has been attempted is to set up various testing labs, for example, in different product sales regions, and install a number of components for testing and training purposes. As more components are developed, they are usually added to these individual systems to facilitate further testing and training. This requires manual interaction by an operator to both install the components and to test them. Complicating matters, installing the components can often be difficult, and these components must be properly integrated into a system to be tested. Further, most customer systems are quite diverse and usually require components to be tested either on their own systems or on similar systems with like components.

In addition, because each sales region is usually defined geographically, testing facilities can be numerous and are seldom standard in configuration or content. This also can make training on the use and maintenance of such systems difficult. For example, at present, people must be physically located at a testing/training facility to operate particular systems there. Labs are designed with in-place and loaned equipment and configured as close to the customer or production configuration as possible. Operational testing is done, results are gathered and analyzed, and the test configuration is disassembled to prepare for the next test configuration. Tools are unavailable for capturing and reusing device configurations, topologies, and network traffic activities. Lab scenarios and configurations are not documented and reused, and lab equipment utilization falls to about 20%.

Additionally, conventional network lab facilities tend to be large, physical installations. They can be thousands of square feet in size and represent millions of dollars in both capital and annual operating expenses. Staffing these facilities can often require between 30 and 100 network engineers. In this lab environment, engineers may only be able to accomplish approximately 20–30 major laboratory configurations per year. A lab operating model developed around these parameters generates a per lab cost basis of about $8,000 to $10,000 per lab per engineer. For each engineering test, this amounts to more than $200,000 being expended annually. These costs are extremely high given a usage rate of only approximately 20%. With the forecasted growth of network systems expected to increase significantly, the potential for engineering costs to increase is high.

There exists a need for standardizing such facilities to facilitate the testing of components and systems, while providing a remote interface to allow users to access these facilities remotely to configure the facilities for testing and support, and for training people to use these systems in these facilities, thereby steadying the rising development and testing costs. It is to these ends that the present invention is directed.

SUMMARY OF THE INVENTION

The invention provides a system for remotely configuring a plurality of devices to customize a lab network system for testing components and for training operators to use and maintain such systems. The system is configured to remotely access and control such a system via a computer network such as the Internet. Once connected, a user can run testing scenarios on the configured devices remotely from any location that has access to the Internet.

In accordance with the invention, an organization's network equipment is integrated with specialized physical switching technologies, and controlled by unique management software. Access to the network equipment may be provided remotely, and granted via a scheduling service. Thus, multiple physical equipment labs can be integrated into one globally, visible resource, enabling one-stop scheduling of lab time without knowing the detailed inventory of a particular network equipment facility.

Storage capability is provided for network topologies described using a standards-based topology description language. This topology archive is integrated with the equipment lab management software allowing lab efforts to be saved for later reuse. In addition to topology and configuration information, complete session logs can also be saved, allowing "offline" analysis of lab activities. Network topologies and device configurations may be uniquely specified using a provided authoring environment to facilitate customized lab configurations.

In an aspect, the invention affords a system for configuring one or more devices to customize a lab network in one or more participating facilities for testing scenarios using those devices. A language subsystem is provided for creating a network topology description for a scenario. The language subsystem utilizes an XML-based language to describe the network topology description, such as network topology information, device and interface configuration information, and condition state information of the topology and devices. The language subsystem comprises a schema for formally defining the XML-based language to describe the network topology description and a parser for interpreting language expressions and determining whether those expressions are valid for creating a scenario description.

A scenario scheduling subsystem is provided for scheduling a facility to execute the scenario and for reserving one or more requested devices to be utilized in executing the scenario. The scenario scheduling subsystem comprises a global scheduler for maintaining scheduling information relating to all of the participating facilities in an associated global schedule database, and a global inventory database for maintaining information relating to all of the devices within the participating facilities. The global scheduler interfaces with a local scheduler located in respective ones of the participating facilities for maintaining scheduling information relating to that facility in an associated local schedule database, and a local inventory database for maintaining information relating to all of the devices within that facility. The scenario scheduling system may also include an authentication system for authenticating users accessing the scheduling system to ensure that only those users having valid access can request scheduling of scenarios using the scenario scheduling system.

A lab management subsystem is also provided for executing scenarios. Each participating facility may include its own lab management subsystem. The lab management subsystem comprises a local scheduler for maintaining scheduling information relating to an associated facility in an associated local schedule database, a scenario manager for interpreting and executing scheduled scenarios, and an inventory manager for interacting with the scenario manager to retrieve description information about the devices maintained in a local inventory database and for configuring the devices in accordance with the description information to enable the devices to be used in the scenario. The lab management subsystem also includes a device controller for managing the operation of the one or more devices utilized in executing the scenario, a proxy server for providing access to device consoles enabling authorized users to control the devices during the executing scenario, a switch controller for controlling switching systems used during the executing scenario, and an OS/Image manager for maintaining an archive of system images in an associated image database and delivering the system images to devices under control of the scenario manager. A lab maintenance client may interface with the lab management subsystem enabling remote control of the lab management subsystem and remote monitoring of the participating facilities. A scenario archive subsystem may also be provided for archiving custom created scenarios for reuse in an associated archive database.

The invention also affords a method for configuring one or more devices to customize a lab network in one or more participating facilities for testing scenarios using those devices. The method comprises the steps of creating a network topology description for a scenario, scheduling a facility to execute the scenario and reserve one or more requested devices to be utilized in executing the scenario, and executing the scenario. The method also includes the step of archiving the executed scenario for reuse.

The creating step includes using a visual tool application to create the scenario by drawing a network topology, and automatically translating the network topology into a scenario that can be executed by a lab management subsystem. The scheduling step includes accessing a scenario scheduling subsystem to schedule a scenario request, and determining a facility and one or more devices to be used to fulfill the scenario request. The executing step includes retrieving description information about devices to be used in executing the scenario, configuring the devices in accordance with the description information to enable the devices to be used in the scenario, and managing the operation of the devices during the executing scenario.

DETAILED DESCRIPTION OF THE PREFERRED EMBODIMENT

Figure 1:
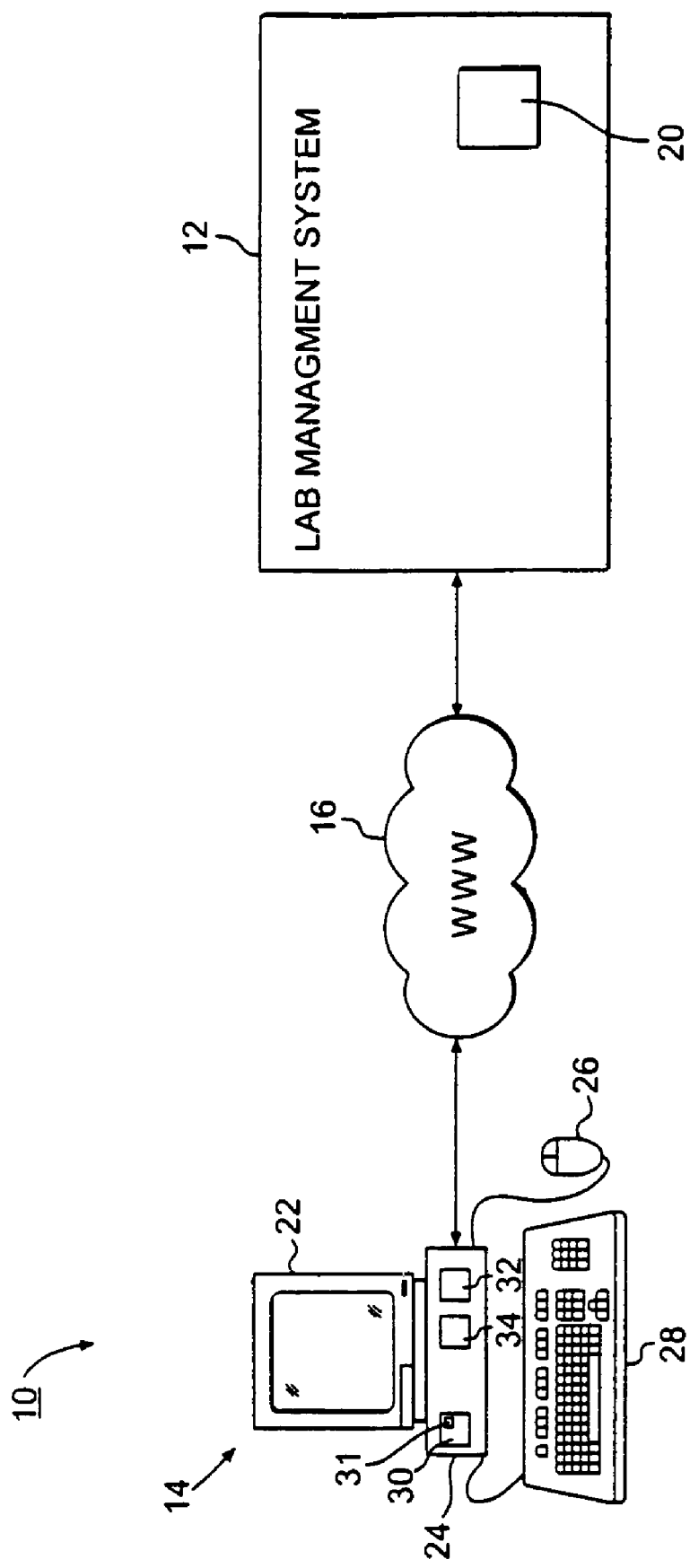
FIG. 1 is a diagram of a network architecture with which the invention can be accessed.

The present invention provides an integrated set of tools and services that enable a user to securely and reliably access an arbitrary network topology on demand using a computer network, such as the Internet. FIG. 1 shows a diagram of a network architecture for accessing the remote lab system of the invention. The architecture 10 may include a lab management system 12 connected with one or more clients 14 across a wide area network (WAN) 16, such as the Internet, or more particularly, the World Wide Web. The lab management system 12 may comprise one or more subsystems (described below) that may be executed by a microprocessor 20 in the lab management system 12 in order to operate as the remote lab system of the invention. The Internet 16 permits the lab management system 12, when accessed by an individual client 14, to display a user interface (described below) on the client computer system 14 which permits the client 14 to interact with the lab management system 12.

The client computer system(s) 14 may include a display device 22, a chassis 24, and one or more user input devices, such as a mouse 26 and a keyboard 28. The chassis 24 may house a permanent storage system 30, such as a hard disk drive, optical disk drive, tape drive, or the like, which may store one or more software applications such as a web browser application 31. The client computer system may have a memory 32 resident therein and the software application from the disk 30 may be transferred to the memory 32 to be executed by a CPU 34 in the computer system 14. The browser application may be configured to connect the client 14 to the lab management system 12 over the WAN 16 and remotely configure and run custom lab topologies and scenarios in accordance with the invention.

Figure 2:
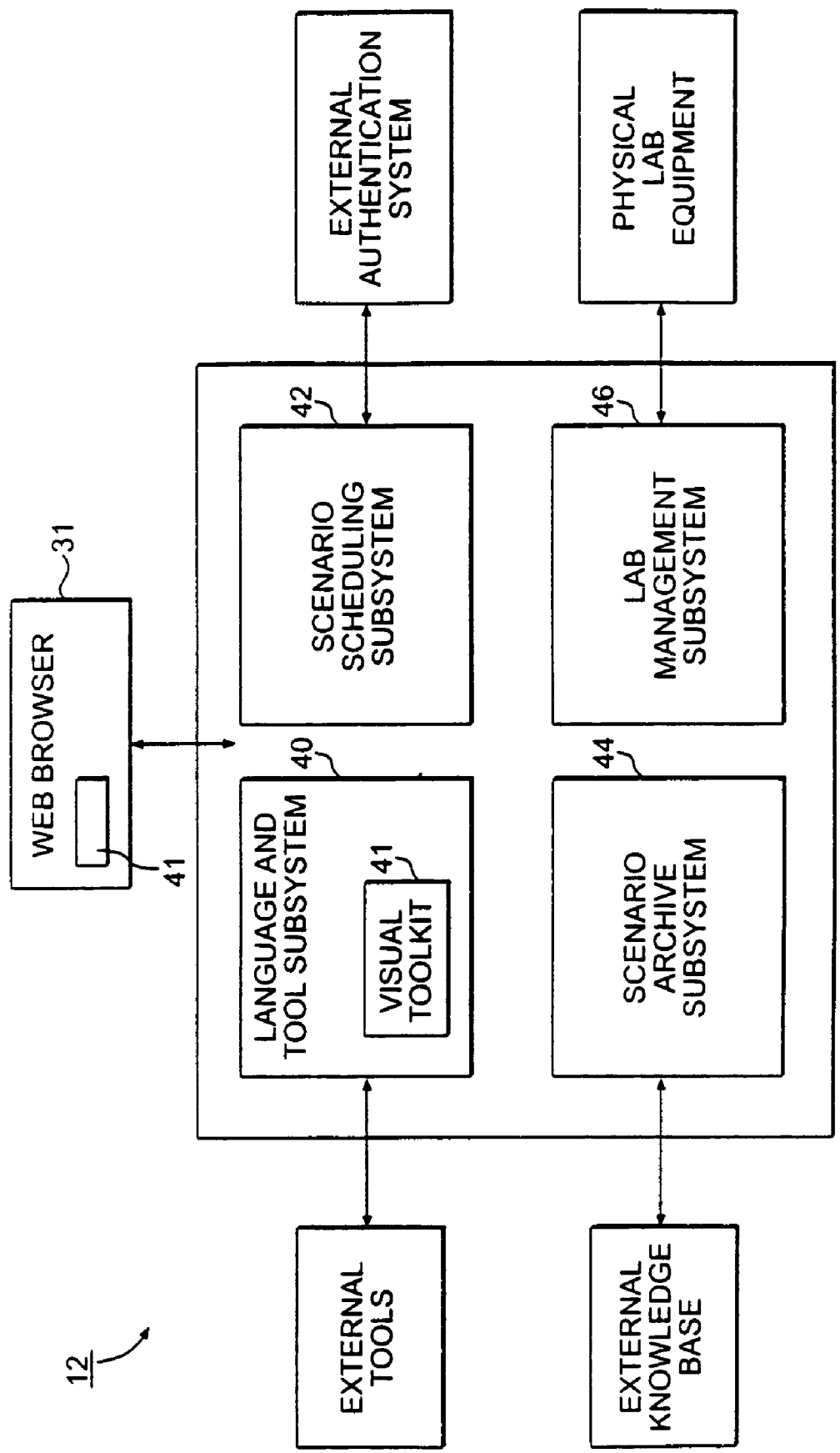
FIG. 2 is a diagram illustrating an exemplary architecture of the system in accordance with the invention.

FIG. 2 is a diagram illustrating an exemplary architecture of the lab management system 12 in accordance with the invention. The system 12 may comprise an integrated set of software and hardware technologies illustrated in FIG. 2 as four major subsystems. Those skilled in the art will recognize that the lab management system 12 could be implemented with any number of subsystems without departing from the invention. The subsystems enable the creation and capture, storage and retrieval, scheduling and executing of lab network topologies in a physical network lab environment.

As shown in FIG. 2, the subsystems comprising the remote lab system 12 may include a language system and tool subsystem 40, a scenario scheduling subsystem 42, a scenario archive subsystem 44, and a lab management subsystem 46. These subsystems will be described in more detail below.

The language and tool subsystem 40 enables the creation and common expression of lab network topologies and configurations (scenarios) that are used by the system 12 to execute customized testing scenarios. Preferably, the invention utilizes an XML-based language to describe lab network topologies, device and interface configurations, and to post condition states of the topologies and devices. This language, referred to as the Network Description Language, or NDL, standardizes network topology descriptions that may be used by the system 12 to execute customized testing scenarios. However, those skilled in the art recognize that other languages may be used without departing from the invention. As will be described below, the language and tool subsystem 40 may include a visual software tool 41 for facilitating the creation of these network topology and device configuration descriptions. The software tool 41 is preferably integrated with the user's browser application 31, for example, as a Java applet, and allows the user to "draw" a network topology, automatically translating the user's description into an actual configurable topology to be used in the physical laboratory.

Preferably, the software authoring tool 41 is built upon Visio, a visual drawing and diagramming tool available from Microsoft Corporation, for creating NDL descriptions of lab network topologies and device configurations. Alternatively, NDL descriptions may be created using a web-based generator, or other text editor without departing from the invention.

Figure 3:
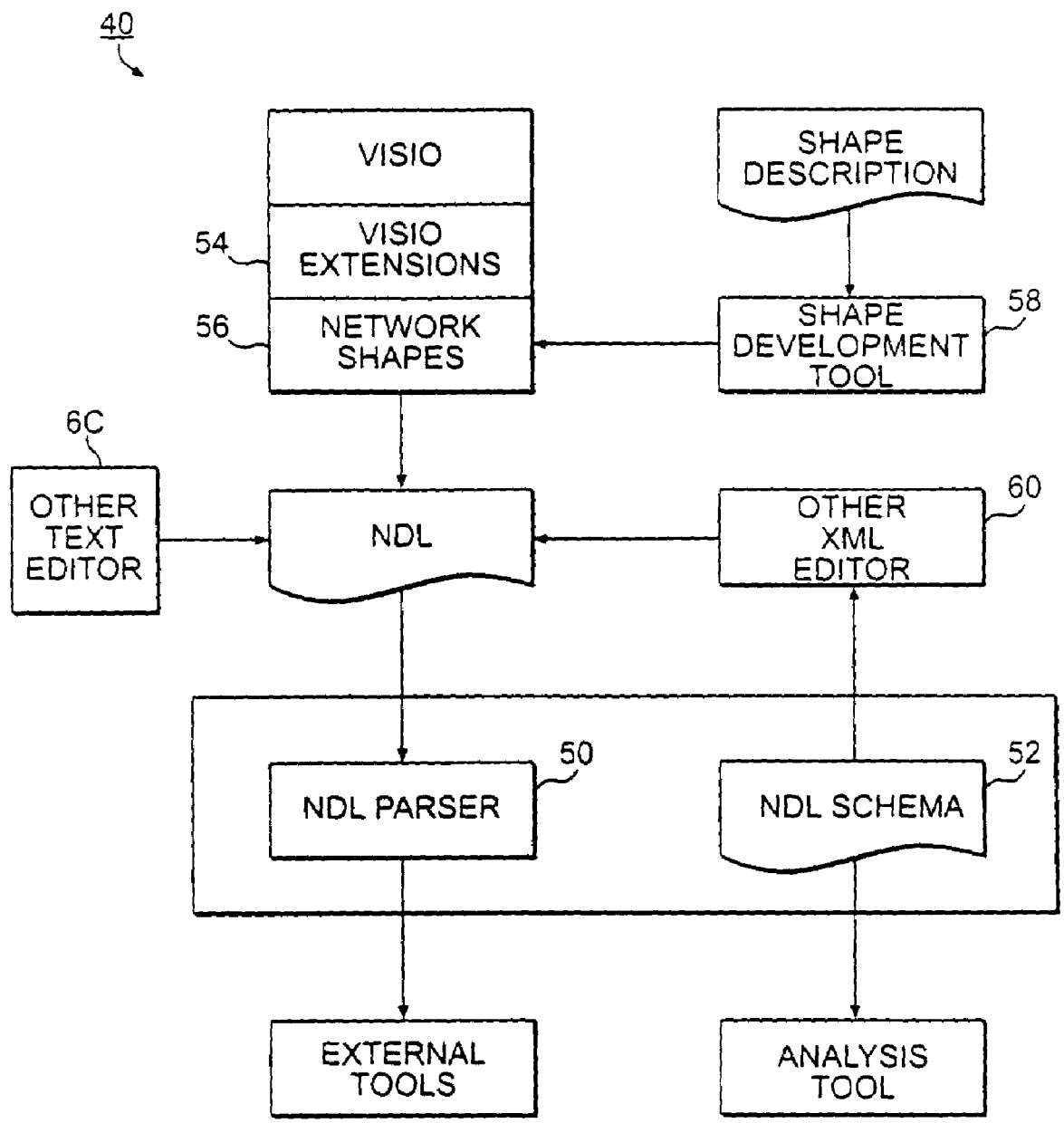
FIG. 3 is a diagram illustrating, in more detail, the language and authoring subsystem shown in FIG. 2.

FIG. 3 is a diagram illustrating, in more detail, the language and tool subsystem 40 shown in FIG. 2. As described above, the language and authoring subsystem 40 defines an XML schema using NDL, providing shapes, stencils, libraries, and tools to create a Visio-based visual editor for NDL, providing NDL analysis tools and providing a parser and related library elements to allow others to create NDL-aware tools. The principle elements of the language subsystem 40 are the NDL parser 50 and the NDL schema 52. The schema 52 formally defines the NDL language. The schema 52 is preferably an XML Data Type Definition (DTD). The parser 50 is preferably a Java-based object that interprets NDL expressions and determines whether they are well formed and valid.

In addition to the parser 50 and the schema 52, the subsystem 40 provides a set of extensions 54 to the Visio drawing application, preferably written in C++, which enables certain Visio shape objects to translate those objects to NDL descriptions on request. The subsystem 40 provides a set of these objects in a stencil 56. A development tool 58 is also provided to facilitate construction of NDL-aware shape objects. Since NDL is an XML based language, any text or XML editor 60 can be used to create NDL expressions.

Returning to FIG. 2, the scenario scheduling subsystem 42 is responsible for selecting an appropriate lab (from the numerous physical and geographically distinct labs) for executing an NDL-described scenario. The scenario scheduling subsystem 42 may include a globally accessible scheduling module 70, and may interface with local scheduling systems (described below) in each lab facility to enable selection of the most appropriate lab facility to execute a specified scenario. Thus, the scheduling subsystem 42 can substantially increase lab utilization by scheduling user access to remote physical labs and user access to remote devices and equipment when local labs are booked or unavailable.

The scheduling subsystem 42 enables authenticated, prioritized scheduling of individual or group access to network equipment in particular lab facilities. Preferably, the scheduling subsystem 42 is accessible to users via the Internet 16, for example, via a Java servlet that communicates via the HTTP protocol to the user's browser to serve a webpage, to enable users to remotely access the lab management system 12 and establish scheduling times for accessing network equipment and engage in testing scenarios. Advantageously, the scheduling subsystem 42 transparently schedules access to facilities regardless of the location of the physical lab or the location of the user.

In operation, a user accessing the Internet 16 via his/her web browser application 31 may access an instance of a webpage designed to interact with the scheduling subsystem 42 of the lab management system 12, and request access to a particular combination of lab equipment. The scheduling subsystem 42 may, based on the user's request, determine the best lab facility for implementing the user's request, and assign the requested devices (with their requested configurations) to the user for use during a predetermined time. This allows global lab resources to be leveraged from any location, thus increasing lab utilization and reducing cost.

Figure 4:
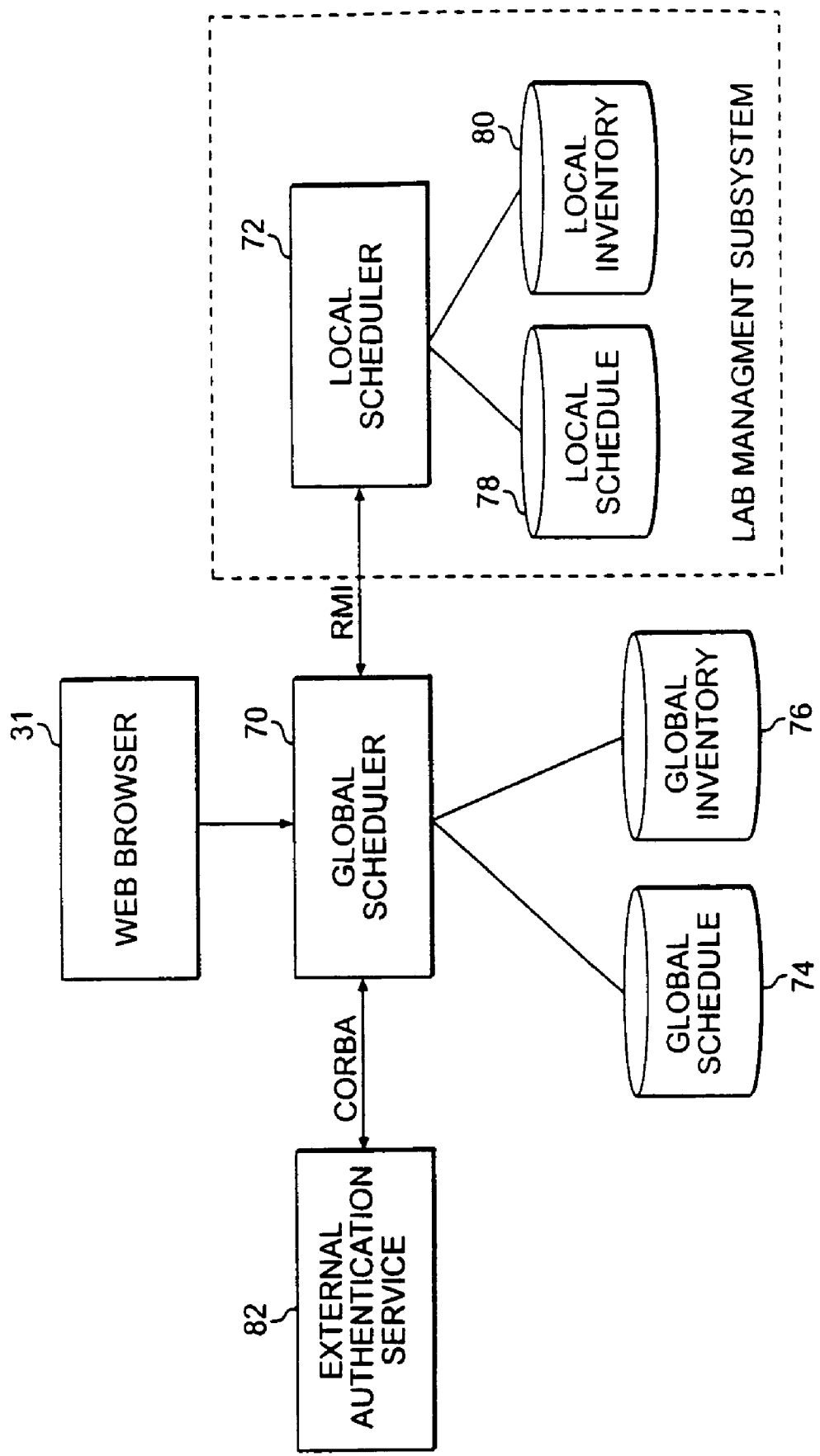
FIG. 4 is a diagram illustrating, in more detail, the scheduling subsystem shown in FIG. 2.

As described above, the scheduling subsystem 42 may be comprised of a global scheduler 70 and a local scheduler 72 (included in the lab management subsystem 46 described below). FIG. 4 is a diagram illustrating, in more detail, the scheduling subsystem 42 shown in FIG. 2. The global scheduler 70 may be associated with a global schedule database 74 and a global inventory database 76 for maintaining information about the various facilities and equipment within the network. The global schedule database 74 maintains a scheduled state of all resources (i.e., devices) in all facilities in the network. Preferably, the scheduled state of a local facility is cached (i.e., replicated) within that lab's local scheduler database 78 associated with the local scheduler 72 in that facility. This is done primarily to increase performance and to insure the system is resilient in the face of partial network failures. During an instance where the local schedule database 78 and the global database 74 are inconsistent, the information maintained in the global database 74 is preferably relied upon for scheduling.

The global scheduler 70 also maintains a global inventory database 76 that maintains information about lab resource inventory within the network. The inventory of each local lab is also preferably maintained within the local lab's own inventory database 80 associated with the local scheduler 72. In contrast with the scheduling databases 74, 78, the local inventory database 80 is dominant over the global inventory database 76. Thus, when inconsistencies exist between the local and global inventory databases 76, 80, the information maintained in the local database 80 is preferably relied upon for inventory information. Data maintained by the system 12 is preferably stored in relational databases that are accessed using JDBC (Java Database Connectivity) protocol, however, other protocols and database architectures may be used without departing from the invention.

A user may interface with the global scheduler 70 via a web based interface implemented, for example, as a Java servlet that communicates via the HTTP protocol with a user's web browser application 31. Advantageously, the user interface presented to the user via the web browser application 31 may be look-and-feel neutral enabling integration with arbitrary web sites without requiring special design considerations.

The global scheduler 70 may also be integrated with a deployment specific authentication service 82, such as via public CORBA defined interfaces (described below). To integrate an existing authentication service 82 with the scheduler 70, a simple Java implementation of the CORBA interface may be provided that encapsulates the service specific behavior of the authentication service 82. Other interfaces may be utilized without departing from the invention and the above is merely exemplary. The authentication service 82 is primarily used to authenticate users to ensure that only those users that have proper access can schedule lab times and scenarios and otherwise interact with the system 12.

Preferably, programmatic interfaces to the system are built upon XML (Extensible Markup Language) over HTTP, CORBA (Common Object Request Broker Architecture), or RMI (Remote Method Invocation) protocols, however, others may be used without departing from the invention. CORBA is an architecture that enables pieces of programs (objects) to communicate with one another regardless of the programming language used to write the objects or the operating system they execute on. RMI is a set of protocols developed by Sun Microsystems that enables Java objects to communicate remotely with other Java objects. Generally, most of the supported external APIs (application programming interfaces), such as that between the global scheduler 70 and the authentication service, as well as the interface between the web browser 31 and the global scheduler 70, are preferably implemented as XML/HTTP interfaces (but could be implemented with other interfaces without departing from the invention). For example, CORBA APIs may be implemented where needed to support communication with existing external systems in specific deployments. RMI is preferably used for private external interfaces where efficiency takes precedence over extensibility, such as the interface between the global scheduler 70 and the local scheduler 72.

The archive and scheduling systems 44, 46 are preferably deployed on Sun Microsystems hardware running the Solaris 7 or later operating system. The lab management subsystem 44 is preferably composed of a mix of Sun Microsystems hardware running Solaris 7 or later, PC systems running Linux, and proprietary hardware systems implementing various switching technologies.

Referring again to FIG. 2, the scenario archive subsystem 44 provides the ability to archive custom scenarios for later use. The system 12 not only provides the user with the ability to create new lab scenarios from previously created lab topologies and configurations, allowing engineers to extract scenarios from "what-if" and problem solving sessions rapidly, but enables the preservation of work and expertise that, in the past, would have been lost the moment a lab session was concluded.

The system 12 is designed to archive network designs, problems, solutions, training exercises, best-practice scenarios, and the like. The system 12 is also designed to extract the state of a network topology being executed in a physical lab, so that the work performed by users of a lab can be maintained and reused. When an access session is concluded, the user may be presented the opportunity to archive the complete session. This archive may include the initial NDL description of the scenario, the configuration of devices and interfaces at the end of the session, and the complete logs of all interactions with all devices during the session.

Figure 5:
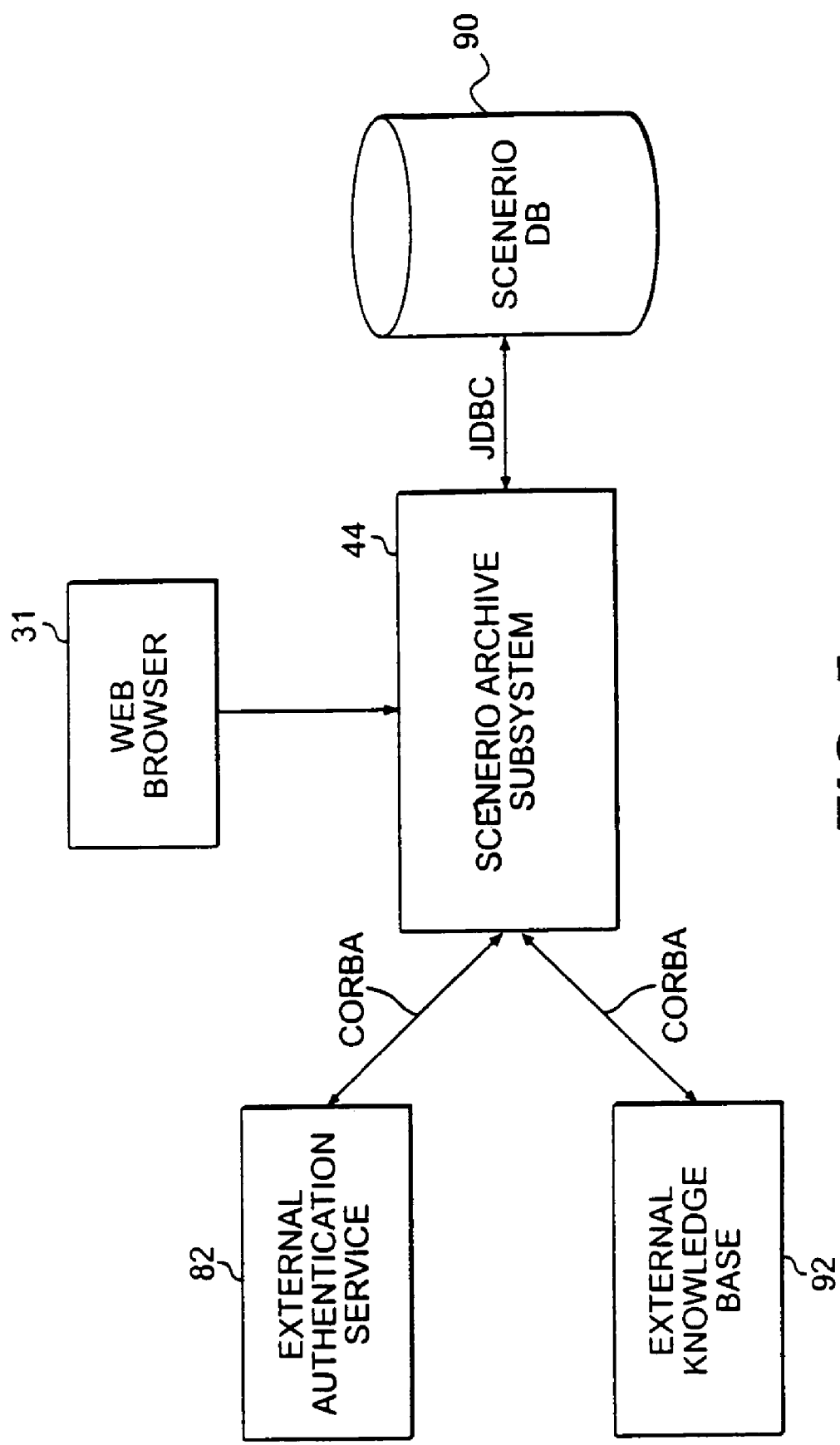
FIG. 5 is a diagram illustrating, in more detail, the scenario archive subsystem shown in FIG. 2.

FIG. 5 is a diagram illustrating, in more detail, the scenario archive subsystem 44 of FIG. 2. The scenario archive subsystem 44 is preferably implemented as a Java servlet based component that is accessible by a user either by invocating the applet from the user's web browser application 31, or via invocation of, for example, an XML/HTTP or CORBA-specified public API. The archive subsystem 44 defines a schema for storing previously executed scenarios in a relational database 90, preferably using JDBC, although other protocols may be used without departing from the invention. Advantageously, the scenario archive subsystem 44 provides the ability to add, modify, and delete NDL-described scenarios, including the optional ability to include logs of lab sessions where the specific scenario was executed.

To locate specific scenarios a search engine application may be utilized by the scenario archive subsystem 44. Different searching methods may be capable, such as free-text searching, tag based searching, and topology indexed searching, among others. To control access to scenarios, the scenario archive subsystem 44 may be integrated with an externally provided authentication system 82, and may also be associated with external knowledge bases 92 to facilitate retrieval of additional scenarios.

Returning again to FIG. 2, the lab management subsystem 46 is designed to execute selected NDL-described scenarios on demand in a physical network equipment lab. Preferably, each participating physical lab environment includes its own lab management subsystem 46.

Figure 6:
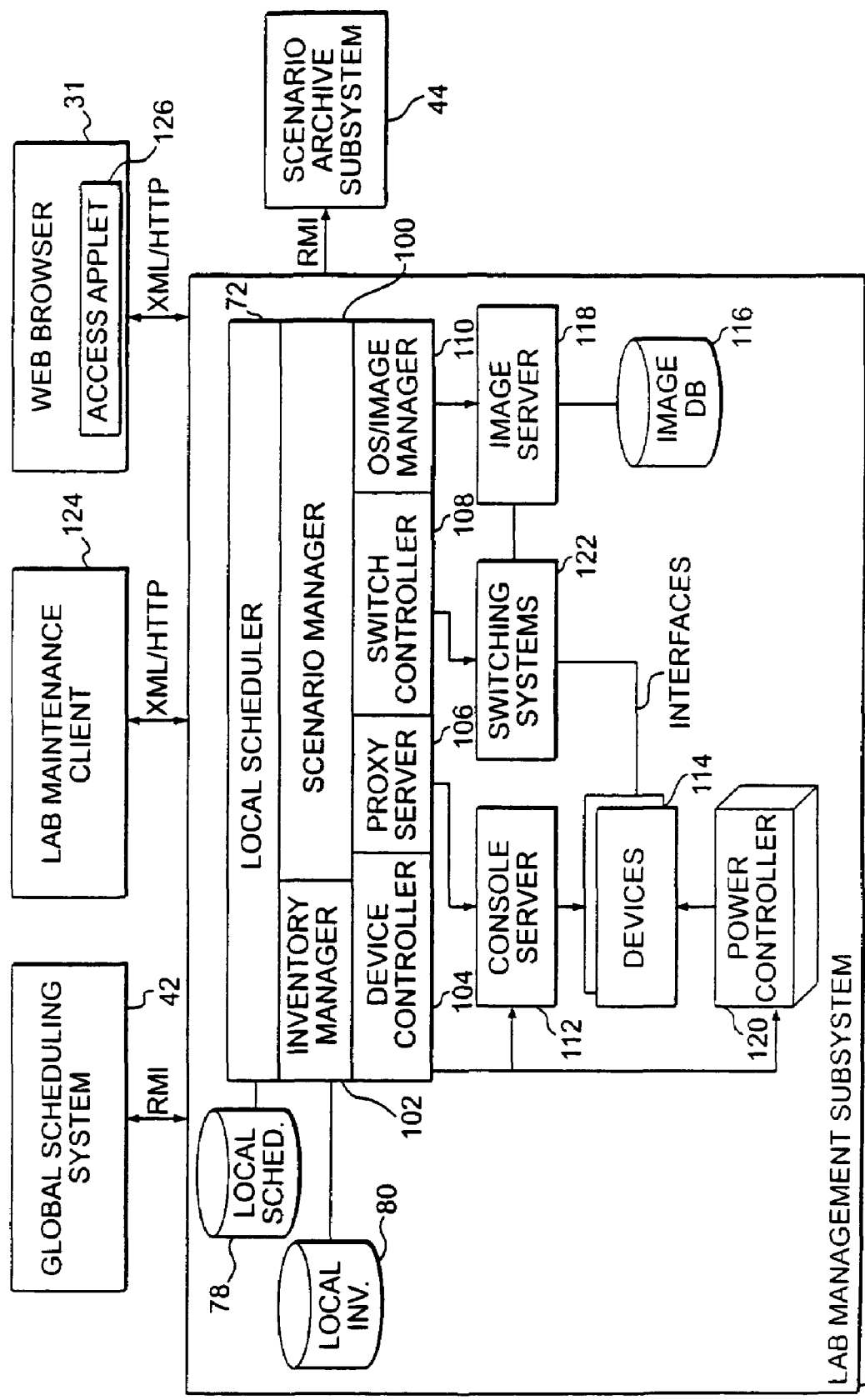
FIG. 6 is a diagram illustrating, in more detail, the lab management subsystem shown in FIG. 2.

FIG. 6 is a block diagram illustrating, in more detail, the lab management subsystem 46 of FIG. 2. In FIG. 6, hardware components are shown as raised three-dimensional blocks. The lab management subsystem 46 may include a local scheduler 72, a scenario manager 100, an inventory manager 102, a device controller 104, a proxy server 106, a switch controller 108, and an OS/image manager 110. The device controller 104, proxy server 106, switch controller 108, and OS/image manager 110 interface with respective hardware components and will be described in more detail below.

As described above, the local scheduler 72 is a cache of the global scheduler 70 (FIG. 4). Entries in the local scheduler 72 preferably consist of those entries (i.e., device reservation) relevant to a particular lab. The lab management subsystem 46 attempts to keep the local scheduler 72 in synch with the global scheduler 70.

In operation, when a user accesses the remote lab management system 12, as described above, the user may initiate a scheduling request for particular devices and lab time and transmit that request to the scenario scheduling subsystem 42 (FIG. 2). The global scheduling system 70 (FIG. 4) may pass the scheduling request to the local scheduler 72 which validates the device request against the inventory information maintained in the local inventory database 80 (maintained by the inventory manager 102), and existing schedule information maintained in the local scheduling database 78, and fulfills (i.e., schedules) the request if possible. Preferably, the local scheduler 72 does not perform prioritization or access control over the request, since this is done by the global scheduling system 70. The local scheduler 72 and the global scheduling system 70 are preferably maintained in synchronization. However, in the event of a data inconsistency between these systems, the global scheduling system 70 is considered to contain the most accurate scheduling information.

The local scheduler 72 is responsible for maintaining the integrity of the local inventory database 80. When changes are made to this database 80, the changes are passed to the global scheduling system 70 for synchronizing the global inventory database 76.

The inventory manager 102 maintains the integrity of the inventory database 80. It interacts with the scenario manager 100 to keep track of the state (i.e., configuration, reservation, etc.) of each device maintained in the inventory database 80. It also interacts with the local scheduler 72 to insure that the scheduling system has an accurate snapshot of local lab inventory to facilitate accurate scheduling and reservation of devices in the facilities.

The scenario manager 100 interprets scheduled scenario requests and implements (i.e., executes) the requested scenario in cooperation with the group manager (not shown), inventory manager 102, device controller 104, proxy server 106, switch controller 108, and OS/Image manager 110. In executing a scenario, the scenario manager 100 realizes a requested lab network topology (as described in the NDL description) by accessing the requested devices from the inventory manager 102 and configuring the devices as requested in order to carry out the scenario. When the scenario is complete, control of the devices is returned to the inventory manager 102 which may reinitialize the devices and make them available for use in another session.

The group manager (not shown) allows group labs to be utilized. It maintains a listing of group users, tracks system privileges for members of the groups, and provides client access to requested network topologies via a remote proxy so that group scenarios may be tested.

The inventory manager 102 maintains a listing of available and reserved devices. When a scenario is executed, the inventory manager 102 retrieves NDL descriptions of the devices from the inventory database 80, configures particular devices in accordance with the NDL descriptions, and initializes the requested devices using the device controller 104 to enable the devices to be used in the requested scenario.

The device controller 104 manages the operation of a device. The controller 104 may manage the resetting, configuring, and power control for each device used in a requested scenario. To enable the management of devices, the device controller 104 may interact with the scenario manager 100 using a common API interface.

The proxy server 106 provides authenticated, proxied, logged access to device consoles via one or more console servers 112, and to the HTTP port of web managed devices 114 enabling authorized users to control these devices during the scenario. The switch controller 108 functions as a software interface to the underlying switching devices used in the lab, including, for example, electronic matrix switches, optical matrix switches, A/B switches, and the like. The OS/Image manager 110 maintains an archive of system images (in an image database 116) and delivers them via an image server 118 on demand to devices under the control of the scenario manager 100.

Device consoles are preferably managed via terminal servers (not shown) deployed on an internal control network. Data traffic flows from the console server(s) 112 to the appropriate terminal server, then on to the device console port. Device power is preferably controlled programmatically via a power controller 120 which interfaces with the device controller 104. Using the power controller 120 a user can force a power cycle of any device in the topology at any time during the lab session. The device controller 104 can also force a power cycle to devices as needed during device preparation.

Where possible, switching is preferably performed using device transparent matrix switch systems 122 utilizing a fully redundant solid state switching fabric. The invention supports serial switching at up to T3 (E3) rates or higher. Ethernet matrix switching is also supported at up to 100 megabits or more. Gigabit switching is available via non-matrix switching. Optical switching is accomplished with an optical switching matrix, supporting single mode and multi-mode fiber technologies. Single mode optical switching supports up to OC50 or higher, while multi-mode switching is fully bandwidth and technology independent. In certain cases when matrix switching is not available, the system provides programmable A/B switch cascades. While this sort of switching is not entirely scalable, it does enable a much wider range of switching capability.

A lab maintenance client 124 may also be provided that offers the ability to control the lab management subsystem 46, including, for example, adding and removing devices to a lab network, adjusting priorities, and setting blackout periods for devices. It also provides a monitoring capability to remotely monitor facilities. The lab maintenance client 124 preferably interfaces with the lab management subsystem 46 via a public XML/HTTP (or CORBA or other) interface, enabling additional applications to be written to extend the system as delivered, or to integrate the system with existing applications in the deployed environment.

As described above, users may interface with the system 12 using a standard web browser application 31. Remote access to network topologies may be provided, for example, via a Java RMI interface to a Java client (applet and/or application versions) 126. This client 126 provides the user with complete control over the state of individual devices in the network topology. For example, the user can direct the system to temporarily disconnect an interface, or to power cycle a device, or load a fresh copy of an operating system image, or perform other operations, all in real-time from the client 126.

Advantageously, interactions between the user and the devices are logged for later retrieval. A preferred logging API utilizes a RMI interface that is implemented by the scenario archive subsystem 44.

The following examples illustrate the operability and utility of the invention. A user may design a network from his/her desktop using the NDL authoring tool described above by, for example, dragging and dropping device icons from the stencil in the Visio-based (or other) authoring tool onto the drawing page. Once the device icon is on the page, the user may specify configuration parameters, device operating system or image, as well as other characteristics of the device, such as a label or description of the device's purpose in the topology. The user may connect interfaces between various devices, for example using a link creation tool, and then specify the type of link requested (i.e., Ethernet, Fast Ethernet, ATM, etc.). Once the user has completed drawing a network topology, the description of the network can be exported from the authoring system to the local file system as an NDL file.

In order to upload the network description (NDL) to the archive, the user may access the system via a browser, for example, logging in through the system's main webpage by typing in a user name and password. Once the system has authenticated the user, the user may then navigate through HTML (or similar) links to the archive webpage. From the archive webpage, the user may specify the NDL file on the hard disk to be uploaded into the system. The user may also list the existing NDL topologies that have been previously uploaded into the archive.

In order to schedule a reservation for a lab session, the user may navigate via the web browser application to a scheduling webpage, and enter the preferred time, date and duration of the lab session he/she wishes to schedule. The user may also indicate the topology containing the equipment he/she wishes to reserve. The scheduler returns a list of possible lab session reservations that meet the user's specified criteria and the user may select one of those choices, which the scheduler may confirm. While on the scheduling webpage, the user may also list all reservations he/she has previously made, and may cancel any of these.

Prior to the start of the user's reserved lab session, the lab's local scheduler may feed the reservation to the scenario manager to be realized with the physical equipment in the lab. The lab management system may connect all of the links between the interfaces on each device as specified by the user in the NDL topology by, for example, controlling a matrix switch. In addition to connecting the links, the lab management system may apply the configurations to each device as specified by the user in the NDL. After the lab management system has connected the links and applied the configurations, the user may be permitted to access the equipment, for example, via a Java applet from the user's browser.

When accessing the lab session, the user may be presented with a graphical user interface that represents the topology as drawn in the authoring tool. The devices and links are distributed in approximately the same visual layout as originally authored. The user may access menus for each device or link by clicking the mouse with a sprite (i.e., cursor) over the item to be selected. From the device menu, the user may, for example, control the power to a device, turning it on or off. The user may also access the console of a device by selecting a menu item. The user will then experience console access with that device, preferably as a character-based, telnet-like window provided via the graphical user interface, or as a web-based interface depending on the capabilities of the individual device. The user may dynamically make and break links between device interfaces by manipulating the GUI representation of the links and devices. Accordingly, the user may conduct desired scenarios using the invention as described above.

Another example illustrating the utility of the invention involves testing. In order to evaluate a network's ability to withstand traffic storms, a service provider may author a topology containing, for example, several ATM switches and one or more traffic generators. This topology, described in NDL, could be uploaded into the archive and scheduled for testing in a lab either manually via the browser based user interface, or in an automated fashion, utilizing the system's public APIs. During the lab session, the topology may be altered to produce a variety of test permutations. For example, the location of a traffic generator in the topology can be changed by breaking existing links between the traffic generator and one or more ATM switches, and creating new links, thus establishing a different physical topology. Configurations on individual ATM switches may be adjusted to test quality of service and other features. During the test session, the logs of each device may be captured, extracted from the system, and analyzed by external tools to evaluate test results. The modified topology may be saved into the archive and re-used for future testing.

In an example illustrating knowledge capture and reuse capabilities of the invention, a subject matter expert may author a network topology for a specific market segment, incorporating industry best practices, or expertise in a particular vendor's product. This topology, described as NDL, may be uploaded into the archive and made available for use by subscribers to the system. Users wishing to design a new network may re-use a topolgy from the archive, adding devices or modifying configurations on existing devices as required by their particular requirements. Once the user has completed their modifications, the topology may be stored in the archive, scheduled in a lab, and exercised during a lab session.

In yet another example illustrating knowledge transfer and development collaboration, lab sessions may be accessed by multiple users. A subject matter expert may assist a user of the system during a running lab session by joining the session and observing the state of the devices in the topology. Each participant in a lab session may access the system from a different geographical location via their Internet browser. Using the console access for a particular device, all participants in a lab session may view the device configuration and activity simultaneously. Using the graphical user interface, all participants in a lab session may view the state of physical links between devices, and the state of power to each device simultaneously. A subject matter expert may examine the device, change configuration parameters, bring interfaces up or down, manipulate the power, or modify the links between devices. These changes are immediately observable by the other participants in the lab session. The modified topology can be saved into the archive for future use.

Another example illustrates interoperability testing capabilities of the invention. A topology may be authored with a specific vendor's products. Several variations of the topology may be created by substituting a different device, either from the same or different vendor. The performance and ability of the different devices to operate correctly with each other in a network can be evaluated by exercising each topology using the system, capturing and extracting the logs from the device consoles, and analyzing the results.

Further, the capabilities of a particular vendor's product, such as an ATM switch, may be demonstrated to a geographically distributed audience via the Internet. A topology which incorporates the device may be authored. The topology, described in NDL, may be uploaded to the archive, scheduled for use, and accessed during a lab session via an Internet browser.

While the foregoing has been described with reference to particular embodiments of the invention, such as a remote lab management, it will be appreciated by those skilled in the art that changes in these embodiments may be made without departing from the principles and spirit of the invention.

What is claimed is:

1. A system for configuring one or more devices to customize a lab network in one or more participating facilities for testing scenarios using those devices, comprising:
　　a language subsystem for creating a network topology description for a scenario;
　　a scenario scheduling subsystem for scheduling a facility to execute the scenario and for reserving one or more requested devices to be utilized in executing the scenario; and
　　a lab management subsystem for executing the scenario, wherein the lab management subsystem comprises a microprocessor:
　　a local scheduler for maintaining scheduling information relating to an associated facility in an associated local schedule database;
　　a scenario manager for interpreting and executing scheduled scenarios; and
　　an inventory manager for interacting with the scenario manager to retrieve description information about the devices maintained in a local inventory database and for configuring the devices in accordance with the description information to enable the devices to be used in the scenario.

2. The system of claim 1, wherein the language subsystem utilizes an XML-based language to describe the network topology description.

3. The system of claim 2, wherein the network topology description includes any of network topology information, device and interface configuration information, and condition state information of the topology and devices.

4. The system of claim 2, wherein the XML-based language is a Network Description Language.

5. The system of claim 1, wherein the language subsystem is accessible via a web browser application.

6. The system of claim 5, wherein the web browser application includes an integrated visual tool that allows a user to create a scenario by drawing a network topology using the visual tool, such that the drawn network topology is automatically translated into a scenario that can be executed by the lab management subsystem.

7. The system of claim 6, wherein the visual tool is integrated with the web browser application as an applet.

8. The system of claim 1, wherein the language subsystem comprises a schema for formally defining an XML-based language to describe the network topology description, and a parser for interpreting language expressions and determining whether those expressions are valid for creating a scenario description.

9. The system of claim 8, wherein the language subsystem further comprises a set of extensions for interfacing with a scenario description creation tool for translating objects created by the scenario description creation tool into the XML-based language.

10. The system of claim 9, wherein additional objects are created using any of a standard text or XML editor.

11. The system of claim 1, wherein the scenario scheduling subsystem comprises a global scheduler for maintaining scheduling information relating to all of the one or more participating facilities in an associated global schedule database, and a global inventory database for maintaining information relating to all of the devices within the one or more participating facilities.

12. The system of claim 11, wherein the global scheduler interfaces with a local scheduler located in respective ones of the one or more participating facilities for maintaining scheduling information relating to that facility in an associated local schedule database, and a local inventory database for maintaining information relating to all of the devices within that facility.

13. The system of claim 11, wherein the scenario scheduling subsystem is accessible via a web browser application.

14. The system of claim 13, wherein the web browser application accesses the scenario scheduling subsystem via an servlet.

15. The system of claim 11, wherein the scenario scheduling system further comprises an authentication system for authenticating users accessing the scheduling system to ensure that only those users having valid access can request scheduling of scenarios using the scenario scheduling system.

16. The system of claim 1, wherein each participating facility includes its own lab management subsystem.

17. The system of claim 1, wherein the lab management subsystem further comprises:
a device controller for managing the operation of the one or more devices utilized in executing the scenario;
a proxy server for providing access to device consoles enabling authorized users to control the devices during the executing scenario, a switch controller for controlling switching systems used during the executing scenario; and
an OS/Image manager for maintaining an archive of system images in an associated image database and delivering the system images to devices under control of the scenario manager.

18. The system of claim 17, wherein a lab maintenance client interfaces with the lab management subsystem enabling remote control of the lab management subsystem and remote monitoring of the one or more participating facilities.

19. The system of claim 1, further comprising a scenario archive subsystem for archiving custom created scenarios for reuse in an associated archive database.

20. A method for configuring one or more devices to customize a lab network in one or more participating facilities for testing scenarios using those devices, comprising:
creating a network topology description for a scenario;
scheduling a facility to execute the scenario;
reserving one or more requested devices to be utilized in executing the scenario;
maintaining scheduling information relating to an associated facility in an associated local schedule database;
interpreting and executing scheduled scenarios;
interacting with a scenario manager to retrieve description information about the devices maintained in a local inventory database; and
configuring the devices in accordance with the description information to enable the devices to be used in the scenario.

21. The method of claim 20, wherein an XML-based language is utilized to describe the network topology description.

22. The method of claim 21, wherein the network topology description includes any of network topology information, device and interface configuration information, and condition state information of the topology and devices.

23. The method of claim 21, wherein the XML-based language is a Network Description Language.

24. The method of claim 20, further comprising accessing the network topology description via a web browser application.

25. The method of claim 24, wherein the web browser application is utilized to allow a user to create a scenario by drawing a network topology and automatically translating the drawn network topology into an executable scenario.

26. The method of claim 25, wherein the visual tool is integrated with the web browser application as an applet.

27. The method of claim 20, further comprising formally defining an XML-based language to describe the network topology description and interpreting language expressions and determining whether those expressions are valid for creating a scenario description.

28. The method of claim 27, further comprising interfacing with a scenario description creation tool for translating objects created by the scenario description creation tool into the XML-based language.

29. The method of claim 28, further comprising creating additional objects using any of a standard text or XML editor.

30. The method of claim 20, further comprising maintaining scheduling information relating to all of the one or more participating facilities and maintaining information relating to all of the devices within the one or more participating facilities.

31. The method of claim 30, further comprising interfacing with a local scheduler located in respective ones of the one or more participating facilities for maintaining scheduling information relating to that facility and maintaining information relating to all of the devices within that facility.

32. The method of claim 30, wherein the scheduling information is accessible via a web browser application.

33. The method of claim 32, wherein the web browser application accesses the scenario scheduling subsystem via an servlet.

34. The method of claim 30, further comprising authenticating users accessing the scheduling information to ensure that only those users having valid access can request scheduling of scenarios.

35. The method of claim 20, further comprising archiving custom created scenarios for reuse.

36. A computer program stored on a computer readable medium having executable instructions for configuring one or more devices to customize a lab network in one or more participating facilities for testing scenarios using those devices, comprising instruction for:

creating a network topology description for a scenario;

scheduling a facility to execute the scenario;

reserving one or more requested devices to be utilized in executing the scenario;

maintaining scheduling information relating to an associated facility in an associated local schedule database;

interpreting and executing scheduled scenarios;

interacting with a scenario manager to retrieve description information about the devices maintained in a local inventory database; and configuring the devices in accordance with the description information to enable the devices to be used in the scenario.

\* \* \* \* \*